(12) United States Patent
Kim et al.

(10) Patent No.: US 7,102,698 B2
(45) Date of Patent: Sep. 5, 2006

(54) METHOD AND APPARATUS FOR CONTROLLING BRIGHTNESS OF IMAGE PROCESSING DEVICE

(75) Inventors: Yong-sul Kim, Gyeonggi-do (KR);
Hye-rim Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 10/659,741

(22) Filed: Sep. 11, 2003

(65) Prior Publication Data

US 2004/0113925 A1 Jun. 17, 2004

(30) Foreign Application Priority Data

Oct. 21, 2002 (KR) .............. 10-2002-0064347

(51) Int. Cl.
*H04N 5/57* (2006.01)

(52) U.S. Cl. .............. 348/687; 348/691; 348/673; 348/689

(58) Field of Classification Search ........ 348/687–689, 348/690, 691, 693, 695, 696, 697, 678, 679, 348/684, 671, 673
See application file for complete search history.

(56) References Cited

U.S. PATENT DOCUMENTS 3,970,777 A * 7/1976 Bradford et al. ............ 348/673
4,745,461 A * 5/1988 Shirai et al. ................ 348/572
4,811,101 A * 3/1989 Yagi ............................ 348/696
5,018,012 A * 5/1991 Tsuji .......................... 348/691
5,191,420 A     3/1993 Lagoni et al.
5,255,080 A * 10/1993 Kageyama et al. ......... 348/675
5,438,341 A     8/1995 Kobayashi et al.

FOREIGN PATENT DOCUMENTS

| EP | 392 100 A1 | 4/1989 |
| EP | 390 179 A1 | 3/1990 |
| EP | 512 332 A2 | 4/1992 |
| EP | 1 235 427 | 8/2002 |
| EP | 1 235 427 A1 | 8/2002 |
| WO | 2/3687 A2 | 1/2002 |

* cited by examiner

*Primary Examiner*—Michael H. Lee
(74) *Attorney, Agent, or Firm*—Staas & Halsey LLP

(57) ABSTRACT

A method and apparatus for controlling the brightness of an image processing device to improve a brightness characteristic of an image signal, by reducing a pedestal voltage range and correspondingly expanding a brightness control voltage range in a highlight mode. The brightness control method includes the operations of determining whether a highlight mode is enabled; and if the highlight mode is enabled, reducing a pedestal voltage range by a first predetermined value and expanding a brightness control voltage range by a second predetermined value. The pedestal driving voltage and the brightness control voltage can be reciprocally controlled without modifications to a circuit having limited amplification, and the brightness can be improved without saturating an image in a highlight mode.

33 Claims, 3 Drawing Sheets

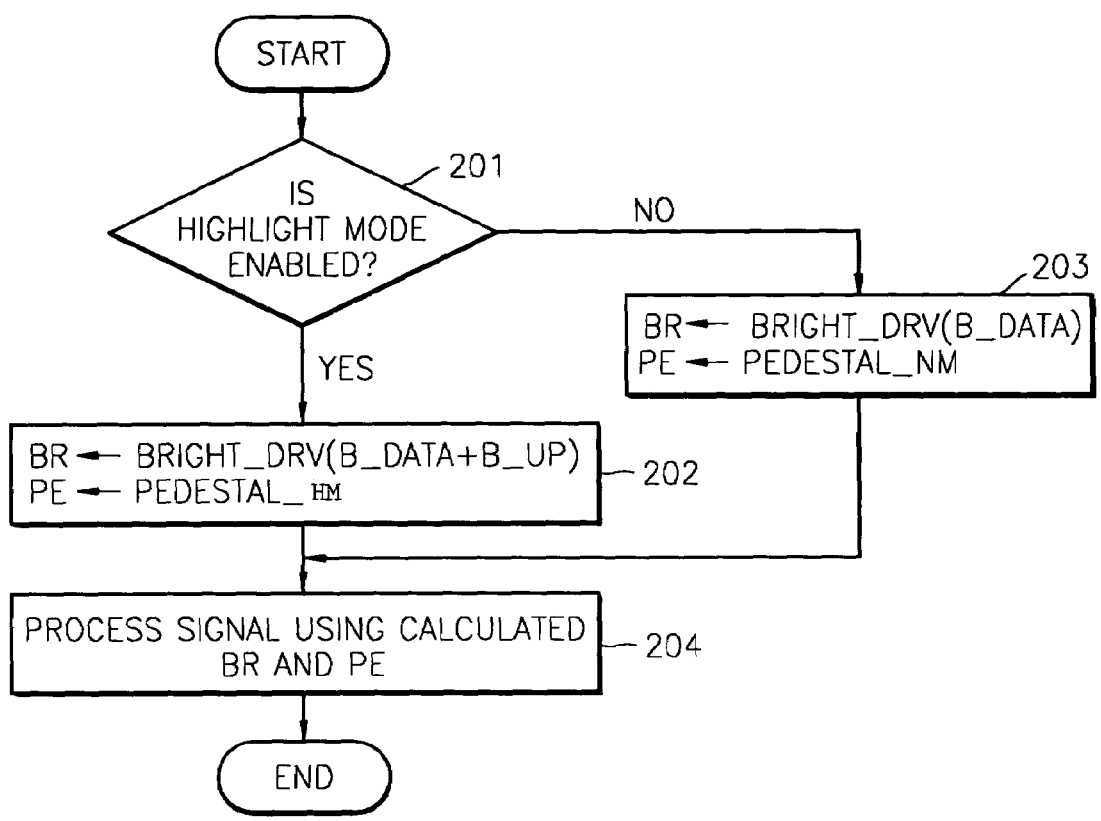

METHOD AND APPARATUS FOR CONTROLLING BRIGHTNESS OF IMAGE PROCESSING DEVICE

CROSS-REFERENCE TO RELATED APPLICATIONS

This application claims the priority of Korean Patent Application No. 2002-64347, filed on Oct. 21, 2002 in the Korean Intellectual Property Office, the disclosure of which is incorporated herein in its entirety by reference.

BACKGROUND OF THE INVENTION

1. Field of the Invention

The present invention relates to a method and apparatus that processes image signals, and more particularly, to a method and apparatus that controls brightness of an image processing device to improve brightness characteristics of image signals in a highlight mode.

2. Description of the Related Art

Generally, a device that processes image signals, such as a display device, enhances the brightness of an image by processing an input image signal via a highlight circuit. An image signal passed through the highlight circuit is amplified by pre-amplifier and main amplifier circuits and applied to, e.g., a cathode ray tube that produces light beams corresponding to the image signals. The brightness of the image displayed on a screen of the display device is determined on the basis of amplitude of the image signals. However, since amplification of the image signals is limited to a certain extent due to characteristics of circuit elements of the pre-amplifier and main amplifier circuits, it is occasionally impossible to display an image as brightly as a user wishes. Particularly, in a highlight mode enhancing the brightness of an image, image signals are likely to be saturated if the pre-amplifier and main amplifier circuits are not capable of sufficiently amplifying the image signals. If the image signals are saturated, the quality of the image is deteriorated.

SUMMARY OF THE INVENTION

The present invention provides a method and apparatus that controls the brightness of an image processing device to improve a brightness characteristic of an image signal, by reducing a pedestal voltage range and correspondingly expanding a brightness control voltage range in a highlight mode.

According to an aspect of the present invention, there is provided a brightness control method used with an image processing device, which includes the operations of determining whether a highlight mode is enabled; and if the highlight mode is enabled, reducing a pedestal voltage range by a first predetermined value and expanding a brightness control voltage range by a second predetermined value.

According to another aspect of the present invention, there is provided a brightness control apparatus used with an image processing device, which includes a memory that stores brightness control data, first pedestal level data predetermined for a normal mode, second pedestal level data predetermined for a highlight mode, and level-up data; a controller that determines whether the highlight mode is enabled, and if the highlight mode is enabled, produces first and second driving voltages using the brightness control data, the second pedestal data, and the level-up data stored in the memory, wherein the first driving voltage is calculated by applying the second pedestal data to a first driving function, and the second driving voltage is calculated by adding the brightness control data and the level-up data and applying the added data to a second driving function; and a signal processor that amplifies an input image signal using the first and the second driving voltages provided from the controller, and outputs the amplified image signal.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments taken in conjunction with the accompanying drawings in which:

FIG. 2 is a flowchart of a brightness control method used with an image processing device according to the present invention.

DETAILED DESCRIPTION OF THE PREFERRED EMBODIMENTS

Figure 1:
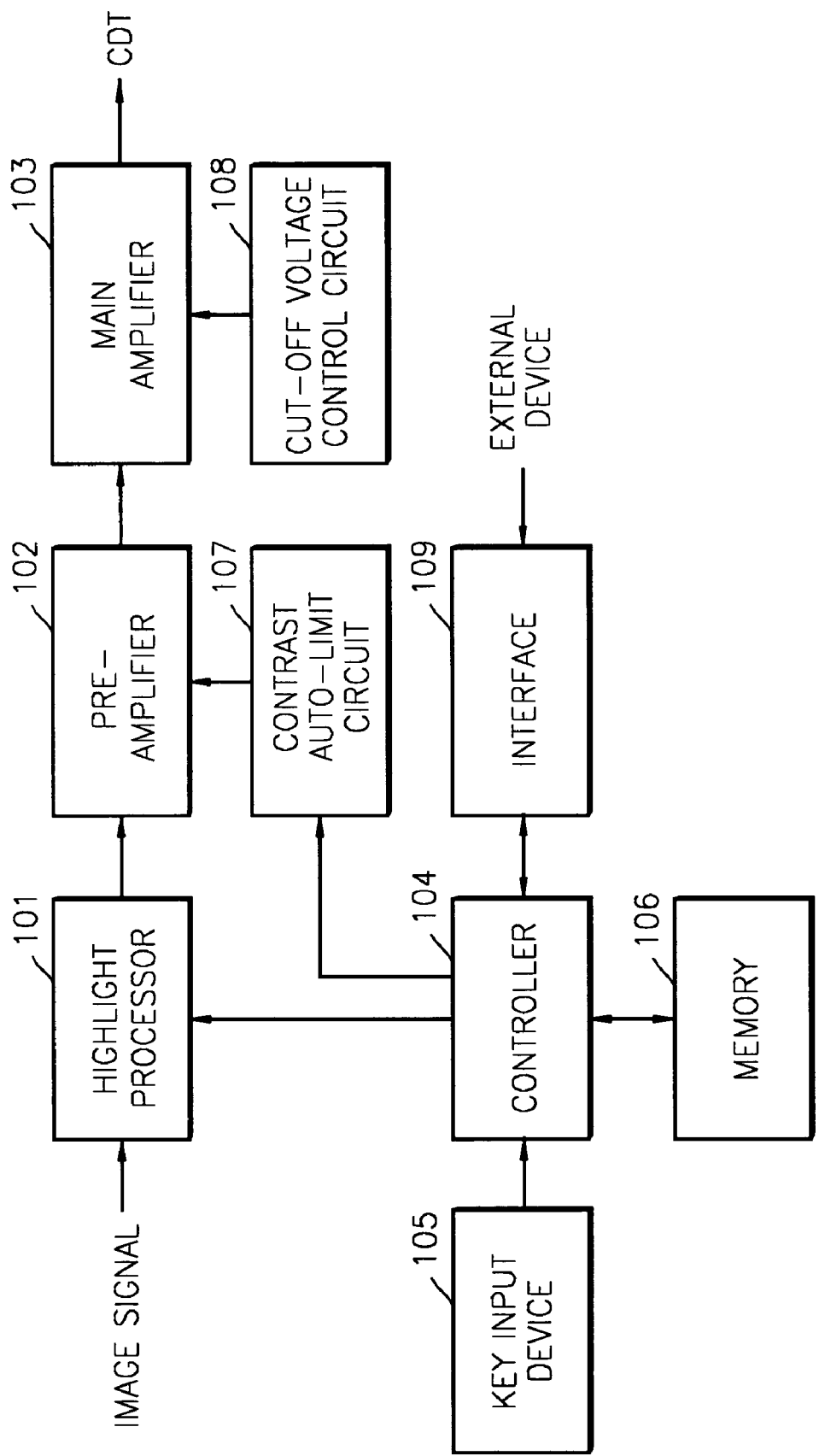
FIG. 1 is a block diagram of a brightness control apparatus used with an image processing device according to an embodiment of the present invention.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

Referring to FIG. 1, a brightness control apparatus used with an image processing device according to the present invention includes a highlight processor 101, a pre-amplifier 102, a main amplifier 103, a controller 104, a key input device 105, a memory 106, a contrast auto-limit circuit 107, a cut-off voltage control circuit 108, and an interface unit 109.

Figure 3A:
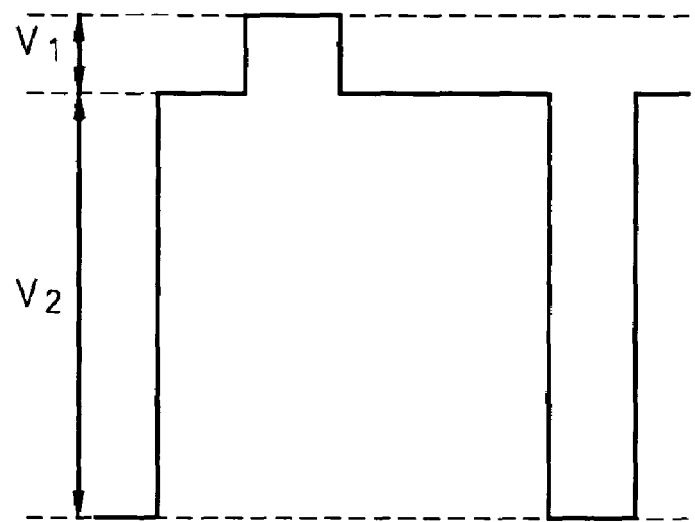
FIG. 3A shows waveforms of image driving voltages in a normal mode and FIG. 3B in a highlight mode according to the present invention.

Due to characteristics of circuit elements of a display device, an image signal driving voltage of the display device is limited to a certain range. In accordance with the range of the image signal driving voltage, a range of a brightness control voltage for controlling a brightness characteristic of the image signal is determined. Since the image signal includes a synchronization signal, the range of the brightness control voltage is the range of the image signal driving voltage minus a pedestal driving voltage that corresponds to the synchronization signal driving voltage. That is, as shown in FIG. 3A, while the range of the image signal driving voltage of the display device includes ranges of lengths $V_1$ and $V_2$, the voltage $V_1$ is a pedestal driving voltage that corresponds to a synchronization signal driving voltage, and accordingly, the range of the brightness control voltage is $V_2$.

According to an embodiment of the present invention, the pedestal level can be varied in a highlight mode so that the range of the brightness control voltage can be expanded in a highlight mode. The total range $V_1+V_2$ of the image signal driving voltage cannot be expanded due to the characteristics of the circuit elements. However, if the range $V_1$ of the pedestal driving voltage is reduced, it is possible to correspondingly expand the range $V_2$ of the brightness control voltage to control the brightness characteristic of the image signal from a white level to a black level. In other words, according to the present invention, it is possible to improve brightness by reducing the range of the pedestal driving voltage and correspondingly expanding the range of the brightness control voltage in a highlight mode.

Referring again to FIG. 1, the memory 106 stores various programs to control the image processing device, and data such as brightness control data, first pedestal level data predetermined for a normal mode, second pedestal level data predetermined for a highlight mode, and level-up data. In an embodiment of the present invention, the first and the second pedestal level data are determined such that a pedestal driving voltage obtained using the second pedestal level data is lower than that obtained using the first pedestal level data, and the level-up data is determined such that the brightness control voltage is increased by a value corresponding to the difference between the pedestal driving voltages based on the first and the second pedestal level data. For example, where an image signal driving voltage of a display device has a range of 54V, the first pedestal level data is determined to produce a first pedestal driving voltage having a range of 14V, the second pedestal level data is determined to produce a second pedestal driving voltage having a range of 10V, and the level-up data is determined to have an increase in the brightness control voltage of 4V.

The key input device 105, such as a remote controller, includes a number of button keys for controlling the image processing device. The interface unit 109 is comprised of hardware and software for data communications with an external device such as a computer. That is, the interface unit 109 is provided with various control data for controlling the image processing device from the external device.

The controller 104 determines whether a highlight mode is enabled on the basis of the control data provided from the key input device 105, or through the interface unit 109. If the highlight mode is enabled, the controller produces the pedestal driving voltage and the brightness control voltage using the brightness control data, the second pedestal level data, and the level-up data stored in the memory. The pedestal driving voltage is calculated by applying the second pedestal data to a pedestal driving function, and the brightness control voltage is calculated by adding the brightness control data and the level-up data and applying the added data to a brightness driving function.

The highlight processor 101 processes an input image signal to enhance the brightness of an entire image or a selected part thereof using the pedestal driving voltage and the brightness control voltage provided from the controller 104. The image signal passed through the highlight processor 101 is amplified through the pre-amplifier 102 and the main amplifier 103 with amplification corresponding to a predetermined contrast adjustment value, and applied to a display device such as a color display tube (CDT) which converts the electrical image signal into an optical signal.

The contrast auto-limit circuit 107 controls a contrast of a screen of the display device by detecting a beam current flowing in a secondary coil of a flyback transformer (not shown), and varying a contrast voltage of the pre-amplifier 102 in accordance with the detected beam current. The cut-off voltage control circuit 108 detects a voltage across the flyback transformer, and generates a cut-off voltage with a constant level.

A brightness control method for an image processing device according to the present invention will now be described with reference to the flowchart shown in FIG. 2. First, the controller 104 determines whether a highlight mode is enabled (operation 201). The highlight mode is enabled either by a user through the key input device 105 or by an external device through the interface unit 109.

If the highlight mode is enabled in operation 201, the controller 104 reads brightness control data B_DATA, second pedestal level data predetermined for the highlight mode, and level-up data B_UP. In operation 202, the controller 104 calculates a voltage PEDESTAL_HM by applying the second pedestal level data to a pedestal driving function, and determines the calculated voltage PEDESTAL_HM as a pedestal driving voltage PE. Further, the controller 104 calculates a brightness control voltage BR by adding the brightness control data B_DATA and the level-up data B_UP and applying the added data to a brightness driving function BRIGHT_DRV.

If the enabled mode is a normal mode, not a highlight mode, in operation 201, the controller 104 reads first pedestal level data predetermined for the normal mode from the memory 106, and determines the pedestal driving voltage PE to be a voltage PEDESTAL_NM obtained by applying the first pedestal level data to the pedestal driving function. In operation 203, the controller 104 reads the brightness control data B_DATA, and calculates the brightness control voltage BR by applying the brightness data B_DATA to the brightness driving function.

In operation 204, an input image signal is processed using the pedestal driving voltage PE and the brightness control voltage BR calculated in one of the operations 202 and 203.

Figure 3B:
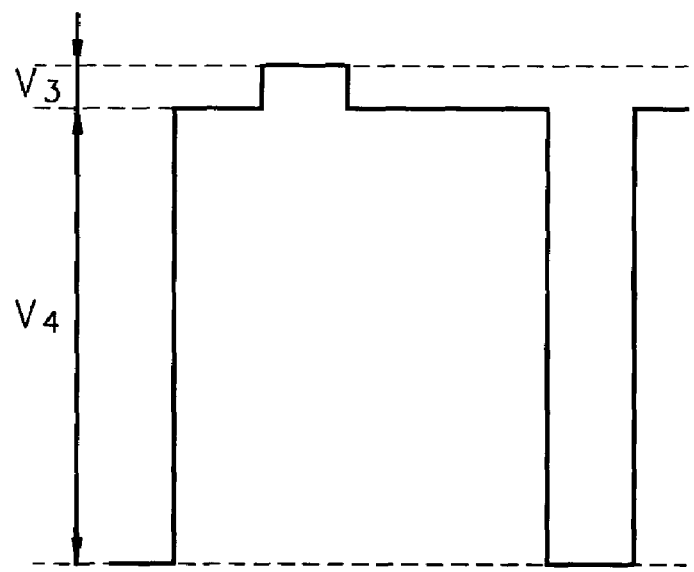

For example, if the pedestal driving voltage $V_1$ has a range of 14V and the brightness control voltage $V_2$ has a range of 50V in a normal mode, as shown in FIG. 3A, the pedestal driving voltage $V_3$ has a range of 10V and the brightness control voltage $V_4$ has a range of 54V in a highlight mode, as shown in FIG. 3B. Therefore, it is understood that the range of the brightness control voltage in a highlight mode is expanded by 4V compared to in a normal mode.

As described above, according to the present invention, the pedestal driving voltage and the brightness control voltage can be reciprocally controlled without modifications to a circuit having limited amplification, and the brightness can be improved without saturating an image in a highlight mode.

The present invention can be implemented as a computer readable code on a recording medium and executed on a computer. The recording medium may be any kind of medium on which data is stored. Examples of the recording media include ROM, RAM, CD-ROM, magnetic tape, hard discs, floppy discs, flash memory, optical data storage devices, and even carrier waves, for example, transmission over the Internet. Moreover, the recording medium may be distributed among computer systems that are interconnected through a network, and the present invention may be stored and implemented as a computer readable code in the distributed system.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A brightness control method for an image processing device, comprising:
   determining whether a highlight mode is enabled; and reducing a pedestal voltage range by a first predetermined value and expanding a brightness control voltage range by a second predetermined value, if the highlight mode is enabled.

2. The brightness control method according to claim 1, wherein the first and the second predetermined values are substantially the same.

3. A brightness control apparatus for an image processing device, comprising:
a memory that stores brightness control data, first pedestal level data predetermined for a normal mode, second pedestal lever data predetermined for a highlight mode, and level-up data;
a controller that determines whether the highlight mode is enabled, and if the highlight mode is enabled, produces first and second driving voltages using the brightness control data, the second pedestal data, and the level-up data stored in the memory, wherein the first driving voltage is calculated by applying the second pedestal data to a first driving function, and the second driving voltage is calculated by adding the brightness control data and the level-up data and applying the added data to a second driving function; and
a signal processor that amplifies an input image signal using the first and the second driving voltages provided from the controller, and outputs the amplified image signal.

4. The brightness control apparatus according to claim 3, wherein the first and the second pedestal level data are determined such that the first driving voltage value obtained by applying the second pedestal level data to the first driving function is lower than a voltage value obtained by applying the first pedestal level data to the first driving function.

5. The brightness control apparatus according to claim 3, wherein the first and the second pedestal level data, and the level-up data are determined such that the difference between the voltage values obtained by applying the first and second pedestal level data to the first driving function is substantially the same as a voltage value obtained by applying the level-up data to the second driving function.

6. A brightness control apparatus to reduce a range of a pedestal driving voltage and correspondingly expand the range of a brightness control voltage to control a brightness characteristic of an image signal of an image processing device in a highlight mode, comprising:
a memory storing data;
a controller determining whether the highlight mode is enabled, and if the highlight mode is enabled, using the stored data to produce the pedestal driving voltage and the brightness control voltage; and
a signal processor that amplifies the image signal using the pedestal driving voltage and the brightness control voltage, and outputs the amplified image signal.

7. The brightness control apparatus according to claim 6, the data comprising:
brightness control data;
first pedestal level data of a normal mode;
second pedestal level data of a highlight mode; and
level-up data.

8. The brightness control apparatus according to claim 7, wherein the controller calculates the pedestal driving voltage by applying the second pedestal level data to a first driving function.

9. The brightness control apparatus according to claim 8, wherein the controller calculates the brightness control voltage by adding the brightness control data and the level-up data and applying the added data to a second driving function.

10. The brightness control apparatus according to claim 9, wherein the first and second pedestal level data are determined such that the pedestal driving voltage obtained using the second pedestal level data is lower than a pedestal driving voltage obtained using the first pedestal level data.

11. The brightness control apparatus according to claim 10, wherein the level-up data is determined such that the brightness control voltage is increased by a value corresponding to the difference between the pedestal driving voltages based on the first and second pedestal level data.

12. The brightness control apparatus according to claim 6, further comprising:
a key input device to control the image processing device; and
an interface unit to control the image processing device externally.

13. The brightness control apparatus according to claim 6, further comprising a highlight processor to process the image signal to enhance the brightness of an entire image or a selected part thereof.

14. The brightness control apparatus according to claim 13, further comprising:
a pre-amplifier;
an amplifier; and
a display device, wherein the image signal, having passed through the highlight processor, is amplified through the pre-amplifier and the amplifier with amplification corresponding to a contrast adjustment value, and is applied to the display device which converts the image signal into an optical signal.

15. The brightness control apparatus according to claim 14, further comprising a contrast auto-limit circuit to control a contrast of a screen of the display device by detecting a beam current in a secondary coil and varying a contrast voltage of the pre-amplifier in accordance with the detected beam current.

16. A method to control brightness of an image processing device, comprising:
determining whether a highlight mode is enabled; and
reducing a pedestal voltage range and expanding a brightness control voltage range by substantially similar values if the highlight mode is enabled.

17. The method according to claim 16, further comprising enabling the highlight mode using a key input device or an external device through an interface unit.

18. The method according to claim 16, wherein the reducing comprises:
reading brightness control data;
reading second pedestal level data of the highlight mode; and
reading level-up data.

19. The method according to claim 18, wherein the reducing comprises:
calculating a pedestal driving voltage by applying the second pedestal level data to a pedestal driving function; and
calculating a brightness control voltage by adding the brightness control data and the level-up data to a brightness driving function.

20. The method according to claim 19, further comprising processing an image signal using the pedestal driving voltage and the brightness control voltage.

21. The method according to claim 16, wherein if the highlight mode is not enabled, a controller reads a first pedestal level data of the normal mode from a memory, and determines a pedestal driving voltage to be a voltage obtained by applying the first pedestal level data to a pedestal driving function.

22. The method according to claim 20, wherein the controller reads a brightness control data, and calculates a brightness control voltage by applying the brightness data to a brightness driving function.

23. The method according to claim 22, further comprising processing an image signal using the pedestal driving voltage and the brightness control voltage.

24. A brightness control apparatus to reduce a range of a pedestal driving voltage and correspondingly expand the range of a brightness control voltage to control a brightness characteristic of an image signal of an image processing device in a highlight mode implemented as a computer readable code on a recording medium, comprising:
   a memory storing data;
   a controller determining whether the highlight mode is enabled, and if the highlight mode is enabled, using the stored data to produce the pedestal driving voltage and the brightness control voltage; and
   a signal processor that amplifies the image signal using the pedestal driving voltage and the brightness control voltage, and outputs the amplified image signal.

25. The brightness control apparatus according to claim 24, the data comprising:
   brightness control data;
   first pedestal level data of a normal mode;
   second pedestal level data of a highlight mode; and
   level-up data.

26. The brightness control apparatus according to claim 25, wherein the controller calculates the pedestal driving voltage by applying the second pedestal level data to a first driving function.

27. The brightness control apparatus according to claim 26, wherein the controller calculates the brightness control voltage by adding the brightness control data and the level-up data and applying the added data to a second driving function.

28. The brightness control apparatus according to claim 27, wherein the first and second pedestal level data are determined such that the pedestal driving voltage obtained using the second pedestal level data is lower than a pedestal driving voltage obtained using the first pedestal level data.

29. The brightness control apparatus according to claim 28, wherein the level-up data is determined such that the brightness control voltage is increased by a value corresponding to the difference between the pedestal driving voltages based on the first and second pedestal level data.

30. The brightness control apparatus according to claim 24, further comprising:
   a key input device to control the image processing device; and
   an interface unit to control the image processing device externally.

31. The brightness control apparatus according to claim 24, further comprising a highlight processor to process the image signal to enhance the brightness of an entire image or a selected part thereof.

32. The brightness control apparatus according to claim 31, further comprising:
   a pre-amplifier;
   an amplifier; and
   a display device, wherein the image signal, having passed through the highlight processor, is amplified through the pre-amplifier and the amplifier with amplification corresponding to a contrast adjustment value, and is applied to the display device which converts the image signal into an optical signal.

33. The brightness control apparatus according to claim 32, further comprising a contrast auto-limit circuit to control a contrast of a screen of the display device by detecting a beam current in a secondary coil and varying a contrast voltage of the pre-amplifier in accordance with the detected beam current.

* * * * *

UNITED STATES PATENT AND TRADEMARK OFFICE
CERTIFICATE OF CORRECTION

PATENT NO. : 7,102,698 B2  Page 1 of 1
APPLICATION NO. : 10/659741
DATED : September 5, 2006
INVENTOR(S) : Yong-sul Kim et al.

It is certified that error appears in the above-identified patent and that said Letters Patent is hereby corrected as shown below:

Column 5, Line 12, change "lever" to --level--.

Signed and Sealed this

Sixteenth Day of January, 2007

JON W. DUDAS
*Director of the United States Patent and Trademark Office*